United States Patent [19]

Armstrong et al.

[11] Patent Number: 4,507,070

[45] Date of Patent: Mar. 26, 1985

[54] APPARATUS FOR RELEASABLY RETAINING A CONFECTION STICK

[75] Inventors: Robert G. Armstrong, Fitchburg, Mass.; Richard L. Stewart, Anaheim, Calif.

[73] Assignee: Popsicle Industries, Inc., Englewood, N.J.

[21] Appl. No.: 571,046

[22] Filed: Jan. 13, 1984

[51] Int. Cl.³ .......................... B29C 1/00; B29D 3/00; A23G 3/18
[52] U.S. Cl. .................................. 425/126 S; 53/594; 198/646; 198/653; 198/695
[58] Field of Search ...................... 53/594; 425/126 S; 198/653, 646, 695

[56] References Cited

U.S. PATENT DOCUMENTS

| | | | |
|---|---|---|---|
| 2,175,324 | 10/1939 | Stamp | 249/120 |
| 2,513,609 | 7/1950 | Werner | 425/116 |
| 2,625,120 | 1/1953 | Eddy et al. | 425/126 S |
| 2,644,216 | 7/1953 | Aleshin | 248/316 |
| 2,705,857 | 4/1955 | Fox et al. | 53/594 |
| 2,925,052 | 2/1960 | Glass | 425/126 S |
| 2,953,105 | 9/1960 | Rasmusson | 425/126 S |
| 2,953,997 | 9/1960 | Glass | 425/126 |
| 3,031,978 | 5/1962 | Rasmusson | 425/125 |
| 3,038,635 | 6/1962 | Rasmusson | 221/81 |
| 3,110,066 | 11/1963 | Ward et al. | 52/469 |
| 3,478,703 | 11/1969 | Peppler et al. | 425/117 |
| 3,691,608 | 9/1972 | Lowrance | 227/139 |
| 3,730,661 | 5/1973 | Tremblay | 425/126 S |
| 3,785,919 | 1/1974 | Hickman | 428/392 |
| 4,105,384 | 8/1978 | Morch | 425/126 S |
| 4,159,612 | 7/1979 | Johnson et al. | 425/126 S |
| 4,323,336 | 4/1982 | Harper et al. | 425/126 S |
| 4,352,830 | 10/1982 | Billett et al. | 425/126 S |
| 4,392,803 | 7/1983 | Cross et al. | 425/126 S |
| 4,398,628 | 8/1983 | Chisholm | 198/653 |
| 4,425,089 | 1/1984 | Billett et al. | 425/126 S |

Primary Examiner—Willard E. Hoag
Attorney, Agent, or Firm—Panitch Schwarze Jacobs & Nadel

[57] ABSTRACT

An apparatus for releasably retaining a confection stick in a machine during at least a portion of a process for forming a confection on a stick comprises an extractor member having a slot extending therethrough for receiving a confection stick. A one piece plastic retainer member is positioned proximate the slot for engaging and retaining a confection stick which is received within the slot.

6 Claims, 3 Drawing Figures

APPARATUS FOR RELEASABLY RETAINING A CONFECTION STICK

BACKGROUND OF THE INVENTION

The present invention relates generally to an apparatus for releasably retaining a confection stick and, more particularly, to such an apparatus for use in a confection forming machine during at least a portion of the confection forming process.

U.S. Pat. No. 3,031,978, issued May 1, 1962 to Rasmusson and entitled "Frozen Confection Machine" discloses a machine, sold under the name "Vitaline," for forming frozen confections, usually frozen water ice, frozen custard, ice cream, pudding, etc.. The confections produced by such a machine are generally in the form of a tapered block or bar from which extends a relatively flat, straight handle, usually a wooden stick with rounded ends, one of which is embedded in the frozen confection.

Briefly, the confection forming machine as typically described in the above-identified Rasmusson patent, includes a freezing brine tank through which passes a mold conveyor carrying a plurality of mold plates, each such plate including a row (generally six) of tapered molded cavities or molds. The machine also includes a filler apparatus for automatically filling the mold cavities with the confection to be frozen and a handle or stick inserter which is positioned at a point along the brine tank for inserting sticks into the confections in the molds when they are in a partially frozen condition. The machine further includes a defroster apparatus for freeing the frozen confections from their molds and an extractor for gripping the protruding sticks and withdrawing the released confections from their mold cavities for subsequent processing (such as coating) and/or packaging.

The prior art extractor employed in such confection forming machines is comprised of an elongated extractor bar and a two-piece metallic stick retainer assembly. The metallic stick retainer assembly includes a retainer member which is generally V-shaped in cross section and an arcuate metallic spring member for holding the retainer member in contact with the extractor bar and for urging the retainer member into engagement with a confection stick.

The two-piece metallic retainer member is difficult to assemble and disassemble upon the extractor bar. Since the retainer member must be separated from the extractor bar for proper cleaning, the prior art extractor is very difficult to clean and keep clean. In addition, the arcuate spring member often wears out so that the retainer member no longer properly clamps the confection sticks and the retainer member or the spring member may fall into the confection product or into the confection forming machine, causing unnecessary delay in the confection forming process.

The present invention comprises an improved apparatus for releasably retaining one or more confection sticks utilizing a one-piece plastic retainer member. The apparatus is more economical to produce and maintain and operates more efficiently than the retaining apparatus employed by the prior art. In addition, the one-piece retainer member is easily removed from the extractor bar to facilitate cleaning of both the member and the extractor bar.

SUMMARY OF THE INVENTION

Briefly stated, the present invention comprises an apparatus for releasably retaining a confection stick in a confection forming machine during at least a portion of the confection forming process. The apparatus comprises an extractor member having an upper surface and an undersurface and having a slot extending therethrough from the undersurface to the uppersurface, the slot being dimensioned to receive at least one confection stick. A one-piece plastic retainer member engages the extractor member, the retainer member including an arcuate sleeve portion having a first end which engages the undersurface of the extractor member and a second end which engages the uppersurface of the extractor member proximate the slot. A retainer blade portion extends outwardly from the arcuate sleeve portion proximate the second end thereof and an actuator portion also extends outwardly from the arcuate sleeve portion. The arcuate sleeve portion urges the retainer blade portion into engagement with a confection stick received within the slot. The actuator portion facilitates movement of the retainer blade portion against the urging of the arcuate sleeve portion to disengage the retainer blade portion from the confection stick.

BRIEF DESCRIPTION OF THE DRAWING

The foregoing summary, as well as the following detailed description will be better understood when read in conjunction with the appended drawing. For the purpose of illustrating the invention, there is shown in the drawing an embodiment which is presently preferred, it being understood, however, that this invention is not limited the precise arrangement and instrumentality shown. In the drawing.

DESCRIPTION OF A PREFERRED EMBODIMENT

Figure 1:
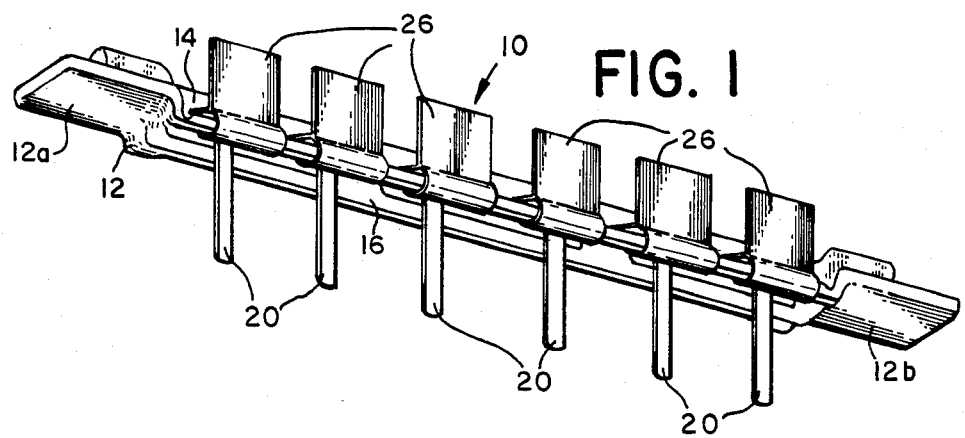
FIG. 1 is a bottom perspective view of an apparatus for releasably retaining a plurality of confection sticks in accordance with the present invention.

Referring in detail to the drawing, wherein like numerals indicate like elements throughout, there is shown in FIG. 1 a bottom perspective view of an apparatus shown generally as 10, for releasably retaining one or more confection sticks in accordance with the present invention. In the presently preferred embodiment, the apparatus 10 is employed in conjunction with a confection forming machine of substantially the same general type as the machine shown and described in expired U.S. Pat. No. 3,031,978 which is incorporated herein by reference. The confection forming machine of the aforesaid patent is adapted for the automated production of a plurality of frozen confection products, for example, ice cream bars on sticks. It will be recognized by those skilled in the art that the apparatus 10 may alternatively be employed in conjunction with other suitable confection forming applications which require the releasable retention of one or more such sticks.

As shown in FIG. 1, the apparatus 10 comprises an extractor member 12, in the presently preferred embodiment an elongated, irregularly shaped, cast metallic member of sufficient length to span the width of the confection forming machine (not shown) within which it is employed and of sufficient width to be relatively stiff and unyielding. Although, in the presently preferred embodiment the extractor member 12 is fabricated of a light-weight metal alloy, it will be appreciated by those skilled in art that the extractor member 12 could alternatively be formed of any other suitable generally rigid material such as polyvinylchloride or the like.

In the presently preferred embodiment, the extractor member 12 is employed in a confection forming machine which is adapted to produce frozen confections in individual molds (not shown) which are positioned six abreast and which are aligned along a generally straight line. Thus, the extractor member 12 is shown as being of a length suitable to engage and retain six generally equally spaced, aligned confection sticks one of which is associated with each of the six confection molds. However, it should be understood that the extractor member 12 may be of any other convenient length as may be required to accommodate any other number of sticks corresponding to the number of molds employed in a particular frozen confection producing machine (not shown). For example, the extractor member 12 may be suitably sized to accommodate eight, twelve, sixteen, etc. such sticks.

Figure 3:
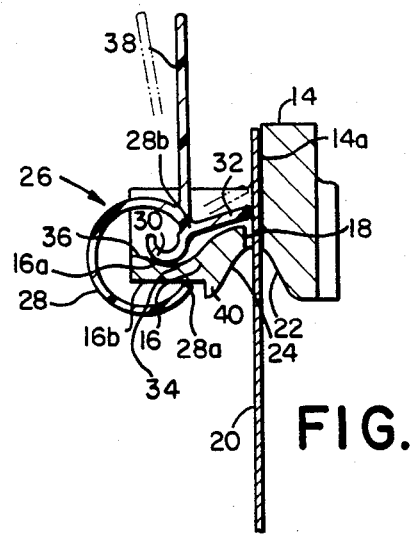
FIG. 3 is a sectional view of a portion of the apparatus taken along line 3—3 of FIG. 2.

As best seen in FIGS. 1 and 3, the extractor member 12 is generally L-shaped in cross section and includes a first, base portion 14 which is generally rectangular in cross section and a second leg portion 16 extending generally perpendicularly to the base portion 14 (toward the left when viewing FIG. 3). Although, for purposes which will hereinafter become apparent, the shape of the extractor member leg portion 16 is somewhat irregular, it too is generally rectangular in cross section. The ends 12a and 12b of the extractor member 12 are suitably configured and adapted to engage and cooperate with the appropriate mating portions of the confection producing machine (not shown).

A plurality of elongated slots 18 (only one of which is shown in FIG. 3) extend completely through the extractor member leg portion 16 at predetermined spaced apart positions along the length thereof. In the present embodiment, there are three such slots 18 which are suitably located to accommodate six sticks (two for each slot) extending from frozen confections within the six aligned molds (not shown).

As best seen in FIG. 3, each slot 18 extends through the extractor member leg portion 16 proximate the position where the leg portion 16 is joined to the base portion 14. Each slot 18 is dimensioned to freely receive a standard-sized wooden confection stick 20 oriented in the manner as shown (i.e. the width of the slot 18 is slightly greater than the thickness of a standard wooden confection stick 20). In the present embodiment one slot 18 is provided to accommodate two spaced apart sticks 20 as shown in FIG. 1. In addition, the length of each slot 18 along the elongated length of the extractor member 12 (i.e. into and out of the paper when viewing FIG. 3) is substantially greater than the width of the two confection sticks 20 so that if, during the confection making process, one or both of the sticks or its associated mold (not shown) are slightly out of position or alignment, the sticks can nevertheless be received within the slots 18. The extractor member 12 also includes suitable chamfers 22 and 24 which extend along the entire length of the underside of the extractor member leg and base portion 14 and 16 proximate the slots 18 to further compensate for misaligned sticks and to help to guide the confection sticks 20 into the slots 18 during the confection making process.

The apparatus 10 further includes releasable retainer means for clamping and holding the confection sticks 20 which are received within the slots 18. In the present embodiment, the retainer means comprises six one-piece retainer members 26 one of which is employed for engaging and retaining each of the confection sticks 20 received within the slots 18. The retainer members 26 may be fabricated of plastic or any other suitable rigid material.

In order to simplify the present application, only a single retainer member 26 will be described in detail, it being understood that the apparatus 10 is comprised of six such retainer members, all of which are the same or substantially the same in structure.

Figure 2:
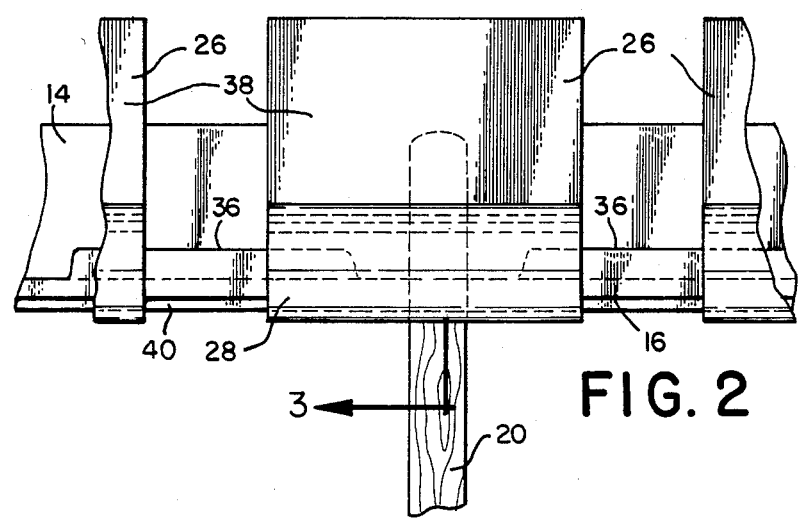
FIG. 2 is an enlarged front elevation view of a portion of the apparatus of FIG. 1 showing only a single confection stick being retained.

Referring to FIGS. 2 and 3, it can be seen that the presently preferred embodiment of the retainer member 26 includes an elongated sleeve portion 28 which is generally arcuate in cross section (see FIG. 3). The arcuate sleeve portion 28 extends around the extractor member leg portion 16 so that a first end 28a engages the extractor member leg portion undersurface 16b. The second end 28b engages the extractor member leg portion upper surface 16b proximate a generally perpendicular shoulder 40 which projects outwardly (downwardly when viewing FIG. 3) therefrom.

As best shown in FIG. 3, the extractor member leg portion upper surface 16a contains a suitable undercut groove 34 for receiving a downwardly or inwardly extending retainer member curved lip portion 30 positioned proximate the second end 28b of the arcuate sleeve portion 28. The groove 34 and the outer surface of the lip portion 30 are both arcuate and correspondingly curved for cooperative engagement as shown. A plurality of generally upwardly extending shoulder members 36 on the upper surface of the extractor member leg portion 16 are provided to abut the distal end of the retainer member lip portion 30 to help hold the retainer member 26 within the groove 34 when the retainer member 26 is actuated for pivotal or rocking movement within the groove 34 as will hereinafter be described.

When standing alone (not installed on the extractor member 12), the two ends of the retainer member arcuate sleeve portion 28a and 28b are closer together than the pertinent width of the extractor member leg portion 16. Thus, when the retainer member is installed around the extractor member leg portion 16, the retainer member arcuate sleeve portion ends 28a and 28b must first be pulled slightly apart or deformed, resulting in an inwardly directed compression force when the two arcuate sleeve portion ends 28a and 28b try to assume their undeformed position and engage the extractor member leg portion 16 to thereby resiliently hold the retainer member 28 in place.

The retainer member 26 further includes a retainer blade portion 32 which extends radially outwardly from the arcuate sleeve portion 28 proximate the second end 28b thereof. As shown in FIG. 3, the retainer blade portion 32 is oriented to engage a confection stick 20 which is received within the extractor member slot 18. The resilient, spring-like urging of the arcuate sleeve portion 28 also urges the blade portion 32 toward the clockwise direction (toward the right when viewing FIG. 3).

If a confection stick 20 is present within the slot 18 shown in FIG. 3, the distal end of the retainer blade portion 32 engages the stick and, under the urging of the sleeve portion 28, holds the stick in place against the generally flat inner surface 14a of the extractor member base portion 14. If no confection stick 20 is present within the slot 18, the retainer blade portion 32 is urged into engagement with the upper surface 16a of the extractor member leg portion 16.

The retainer member 26 further includes an actuator leg portion 38 which also extends radially outwardly from the arcuate sleeve portion 28 proximate the second end 28b thereof. As best seen in FIG. 3, the actuator leg portion 38 is generally perpendicular to the retainer blade portion 32. The actuator leg portion 38 provides a convenient means for pivoting the retainer member sleeve portion second end 28b within the extractor member groove 34 against the urging of the arcuate sleeve portion 28 to disengage the blade portion 32 from a confection stick 20 as shown in phantom in FIG. 3.

As shown, the retainer member 26 comprises a one-piece plastic component which is considerably easier to install and remove from the extractor member 12 than was the two-piece metallic retainer assembly of the prior art. Thus, the present invention is much easier to remove and clean. In addition, since the retainer member 26 is plastic, it can be soaked in a caustic solution to further facilitate cleaning. The arcuate sleeve portion 28 also provides an even pressure along the entire length of the retainer member 26. The small metallic spring member employed in the prior art retainer assembly applied the pressure to the confection sticks in an uneven manner. Moreover, the one-piece retainer member 26 of the present invention is not as likely to fall off of the extractor member 12 and into either the confection or the confection forming machine, thereby resulting in fewer disruptions to the confection forming process.

In operation within a confection forming machine (not shown) the apparatus 10 is employed for the purpose of gripping and holding the confection sticks 20 during a portion of the confection forming process. As described briefly above, during the confection forming process the generally liquid confection product is placed into the confection molds for freezing in the desired shape. As the confection product becomes partially frozen, the confection sticks 20 are inserted into the partially frozen confection product with their ends projecting outwardly, generally in the upward direction. Thereafter, the freezing of the confection product within the molds is completed, thereby forming a generally solid confection product with the confection stick rigidly embedded therein. It is at this point in the confection forming process that the apparatus 10 is lowered to a position aligned with and slightly above the molds so that the confection sticks extend upwardly through the slots 18. Prior to the apparatus actually contacting the sticks 20 the retainer member actuator leg portions 38 are all moved slightly outwardly, against the urging of the arcuate sleeve portion 28 (toward the left when viewing FIG. 3) to rock or pivot the retainer members 26 within the groove 34 and to move the retainer member blade portions 32 away from the slots 18 as shown in phantom in FIG. 3. Once the retainer members 26 have assumed the position as shown in phantom, the apparatus 10 is lowered and the confection sticks 20 are freely received within the slots 18. The chambers 22 and 24 help to guide the sticks 20 into the slots 18.

Thereafter, the retainer member actuator leg portions 38 are released, causing the retainer members 26 to rock or pivot under the urging of the arcuate sleeve portions 28 (toward the right when viewing FIG. 3) and to engage and hold the sticks 20 as shown in FIG. 3. Concurrently with the gripping of the sticks 20 by the apparatus 10 the confection molds (not shown) undergo a defrosting procedure which results in the outer portions of the frozen confections being partially thawed and, therefore, freely releasable from the molds (not shown). The subsequent upward movement of the extractor member 12 results in the sticks 20 with the confections thereon being drawn upwardly out of the molds.

The apparatus 10 is also employed to hold the frozen confections for further processing. For example, the confections may be dipped into chocolate or other such coating means while they are held by the apparatus 10.

Once the processing of the confections has been completed, the apparatus 10 may be employed to lower the confections into suitable wrappers or containers, for example bags (not shown). Once the confections are positioned within the bags (not shown), the retainer members 26 may again be pivoted or rocked against the urging of the arcuate sleeve portion 28 to release the sticks. The apparatus 10 may then be raised away from the sticks which slide freely out of the slots 18 leaving the confections within the bags with the sticks 20 extending out of the open ends thereof.

From the foregoing description, it can be seen that the present invention comprises an improved apparatus for use in a confection forming machine to releasably engage and retain a stick or plurality of sticks utilizing a one-piece plastic retainer member. The one-piece retainer member is easier to install upon and remove from the extractor member to facilitate cleaning and more efficient operation. It will be recognized by those skilled in the art that changes may be made to the above-described embodiment of the invention without departing from the broad inventive concepts thereof. It is understood, therefore, that this invention is not limited to the particular embodiment disclosed, but it is intended to cover any modifications which are within the scope and spirit of the invention as defined by the appended claims.

I claim:

1. In a machine for forming a confection on a stick, an apparatus for engaging and releasably retaining the stick during at least a portion of the confection forming process, the apparatus comprising:

an extractor member having an upper surface and an under surface and having a slot extending therethrough from the under surface to the upper surface, the slot being dimensioned to receive at least one confection stick;

a one-piece plastic retainer member comprising an arcuate sleeve portion having a first end which engages the under surface of the extractor member and a second end which engages the upper surface of the extractor member proximate the slot, a retainer blade portion extending outwardly from the arcuate sleeve portion proximate the second end thereof and an actuator portion extending outwardly from the arcuate sleeve portion, the arcuate sleeve portion urging the retainer blade portion into engagement with a confection stick received within the slot, the actuator portion facilitating movement of the retainer blade portion against the urging of the arcuate sleeve portion to disengage the retainer blade portion from the confection stick.

2. The apparatus as recited in claim 1 wherein the upper surface of the extractor member includes a groove and the retainer member includes a lip portion proximate the second end of the arcuate sleeve portion, the retainer member lip portion engaging the extractor member groove to permit at least a portion of the retainer member to pivot about the groove.

3. The apparatus as recited in claim 2 wherein the extractor member includes a projecting shoulder for engaging the first end of the arcuate sleeve portion to maintain the first end of the arcuate sleeve portion in engagement with the extractor member.

4. The apparatus as recited in claim 3 wherein the retainer member actuator portion is positioned proximate the second end of the arcuate sleeve portion.

5. The apparatus as recited in claim 4 wherein the retainer member actuator portion is generally perpendicular to the blade portion.

6. The apparatus as recited in claim 5 wherein the extractor member groove is generally arcuate, the retainer member lip portion being correspondingly arcuate for cooperative engagement with the groove.

* * * * *